United States Patent [19]

Bushong et al.

[11] Patent Number: 5,686,811
[45] Date of Patent: Nov. 11, 1997

[54] COMPACT BATTERY CHARGER

[75] Inventors: William C. Bushong, Madison, Wis.;
Thomas F. Woods, North Oaks, Minn.

[73] Assignee: Rayovac Corporation, Madison, Wis.

[21] Appl. No.: 745,669

[22] Filed: Nov. 8, 1996

Related U.S. Application Data

[60] Provisional application No. 60/006,503, Nov. 9, 1995.

[51] Int. Cl.[6] .................................................. H01M 7/00
[52] U.S. Cl. ............................ 320/2; D13/107; 429/96
[58] Field of Search ........................ 320/2, 15; D13/107; 429/96, 99

[56] References Cited

U.S. PATENT DOCUMENTS

| | | | |
|---|---|---|---|
| 4,232,260 | 11/1980 | Lambkin | 320/2 |
| 4,303,876 | 12/1981 | Kelly, III et al. | 320/2 |
| 4,766,361 | 8/1988 | Pusateri | 320/2 |
| 4,808,904 | 2/1989 | Ricaud et al. | 320/2 |
| 4,816,735 | 3/1989 | Cook et al. | 320/2 |
| 5,324,598 | 6/1994 | White et al. | 429/65 |
| 5,415,947 | 5/1995 | Mitsui et al. | 429/1 |
| 5,443,924 | 8/1995 | Spellman | 429/65 |

FOREIGN PATENT DOCUMENTS

| | | | |
|---|---|---|---|
| 2164199 | 3/1986 | United Kingdom | 10/46 |

OTHER PUBLICATIONS

EDN, Apr. 13, 1995, "Finding the Keys to Flyback Power Supplies Produces Efficient Design," p. 101–111.

Photograph A: Rayovac Battery Charger.

Photograph B: Archer Battery Charger.

*Primary Examiner*—Peter S. Wong
*Assistant Examiner*—Gregory J. Toatley, Jr.
*Attorney, Agent, or Firm*—Lathrop & Clark

[57] ABSTRACT

A plastic battery housing has a recessed compartment with a contoured support surface which supports two AA, AAA, or AAAA batteries in the same charging position as a single C or D battery. The support surface has two concave depressions suited to support AA batteries, one on either side of a larger diameter depression suited to support either a C or a D battery. A first contact is positioned to engage the positive terminal of the C or D battery, and a second contact is positioned to engage the positive terminals of the two AA batteries. Narrow diameter concave surfaces may be formed within the AA support surfaces for alternatively supporting AAA batteries which would also engage the second contact. A sliding contact element alternatively engages the negative terminal of a single C or D battery or the two negative terminals of AA or AAA batteries.

12 Claims, 4 Drawing Sheets

FIG. I

COMPACT BATTERY CHARGER

RELATED APPLICATION

This application claims the benefit of U.S. Provisional patent application Ser. No. 60/006,503, filed Nov. 9, 1995.

FIELD OF THE INVENTION

The present invention relates to battery charging devices in general, and to devices for charging standard consumer batteries in particular.

BACKGROUND OF THE INVENTION

In today's ever expanding world of battery powered electronic devices, the number and various sizes of batteries that an average household uses has steadily increased. Rechargeable batteries provide an attractive alternative to disposable batteries, due to their overall longer life and reduced cost per use. In addition, the interest in conserving resources has made the use of rechargeable batteries increasingly desirable. Due to the different sizes and numbers of batteries used in an average household, consumers often prefer battery chargers that offer numerous charging positions that enable simultaneous charging of all batteries necessary to power all the devices. Common numbers and types of rechargeable batteries required for particular applications are shown in Table 1.

TABLE 1

Number of Rechargeable Batteries Required for Different Applications

| Application | Number of Batteries | Size of Batteries |
| --- | --- | --- |
| Electronic Game | 8 | AA |
| TV Remote Control | 2 | AAA |
| "Boombox" | 8 | D |
| Flashlight | 2 to 4 | C, D or AA |
| Penlight | 1 to 2 | AAA |
| Electric Razor | 2 | AA |
| Portable CD Player | 4 to 6 | AA |
| Toy car or Truck | 2 | C |
| 35mm Camera | 2 | AA |

The marketplace has reacted to the increased consumer need to charge multiple batteries of various sizes by providing a large number of different battery chargers suitable for charging different types and numbers of batteries at differing rates. At the present time there are many different types of battery chargers available in the marketplace, some of which accept and charge only a few batteries of limited sizes, and others that accept all of the well known AAA, AA, C and D sizes. Still other battery chargers, like the Rayovac PS-1 and PS-2 accept and charge only rechargeable batteries having certain predetermined features. (Further details concerning predetermined features like those found in Rayovac PS-1 and PS-2 battery chargers are described in U.S. Pat. No. 5,443,924 entitled "Discriminating Charger and Compatible Battery" issued Aug. 22, 1995 and in U.S. patent application Ser. No. 08/278,505 entitled "Discriminating Battery Charging System" filed Jul. 21, 1994, the disclosures of which are hereby incorporated by reference in their respective entireties.)

For the consumer desiring an ability to charge many batteries of any size, eight-position chargers which accommodate C, D, AA, and AAA cells are available, but these chargers are relatively large and bulky in comparison to most two-position chargers. Due to the widely varying consumer preferences, no single battery charger commercially available can meet the particular requirements of all or even most users. Chargers will usually have excess charging capacity except when charging only the largest cells. To provide the best value to the consumer, the total cost of the battery charger and the rechargeable batteries should compare favorably to the cost of disposable batteries supplanted by the rechargeable ones. Yet the cost of the charger is tied to the size of the unit. A more compact charger would yield reduced costs in materials, packaging and shipping.

What is needed is a single, compact battery charger that is capable of providing most consumer needs.

SUMMARY OF THE INVENTION

The battery charger of this invention has a plastic battery housing with at least one recessed compartment with a contoured support surface which supports two AA or AAA batteries in the same charging position as a single C or D battery. The support surface preferably has two concave depressions suited to support AA batteries, one on either side of a larger diameter depression suited to support either a C or a D battery. A center contact is positioned to engage the positive terminal of the C or D battery, and at least one side contact is positioned to engage the positive terminals of the two AA batteries. Narrow diameter concave surfaces may be formed within the AA support surfaces for alternatively supporting AAA batteries which may also engage the side contact. A sliding contact element alternatively engages the negative terminal of a single C or D battery or the two negative terminals of AA or AAA batteries. A preferred embodiment of the present invention has four compartments capable of charging either four D or C cells, or eight AA or AAA cells. As devices requiring a larger number of AA batteries are more commonly used than devices requiring more than four D batteries, the charger may be economically produced and requires far less space than a prior art device with eight charging positions for C, D, or AA batteries.

It is a feature of the present invention to provide a battery charger which can recharge multiple small diameter batteries in the same volume occupied by a single larger diameter battery.

It is also a feature of the present invention to provide a battery charger which is of low cost yet which meets most consumer needs for charging positions.

It is another feature of the present invention to provide a battery charger for multiple battery dimensions which occupies minimal volume.

It is a further feature of the present invention to provide a battery charger capable of simultaneously charging different size batteries.

Further objects, features and advantages of the invention will be apparent from the following detailed description when taken in conjunction with the accompanying drawings.

DESCRIPTION OF THE PREFERRED EMBODIMENT

Figure 1:
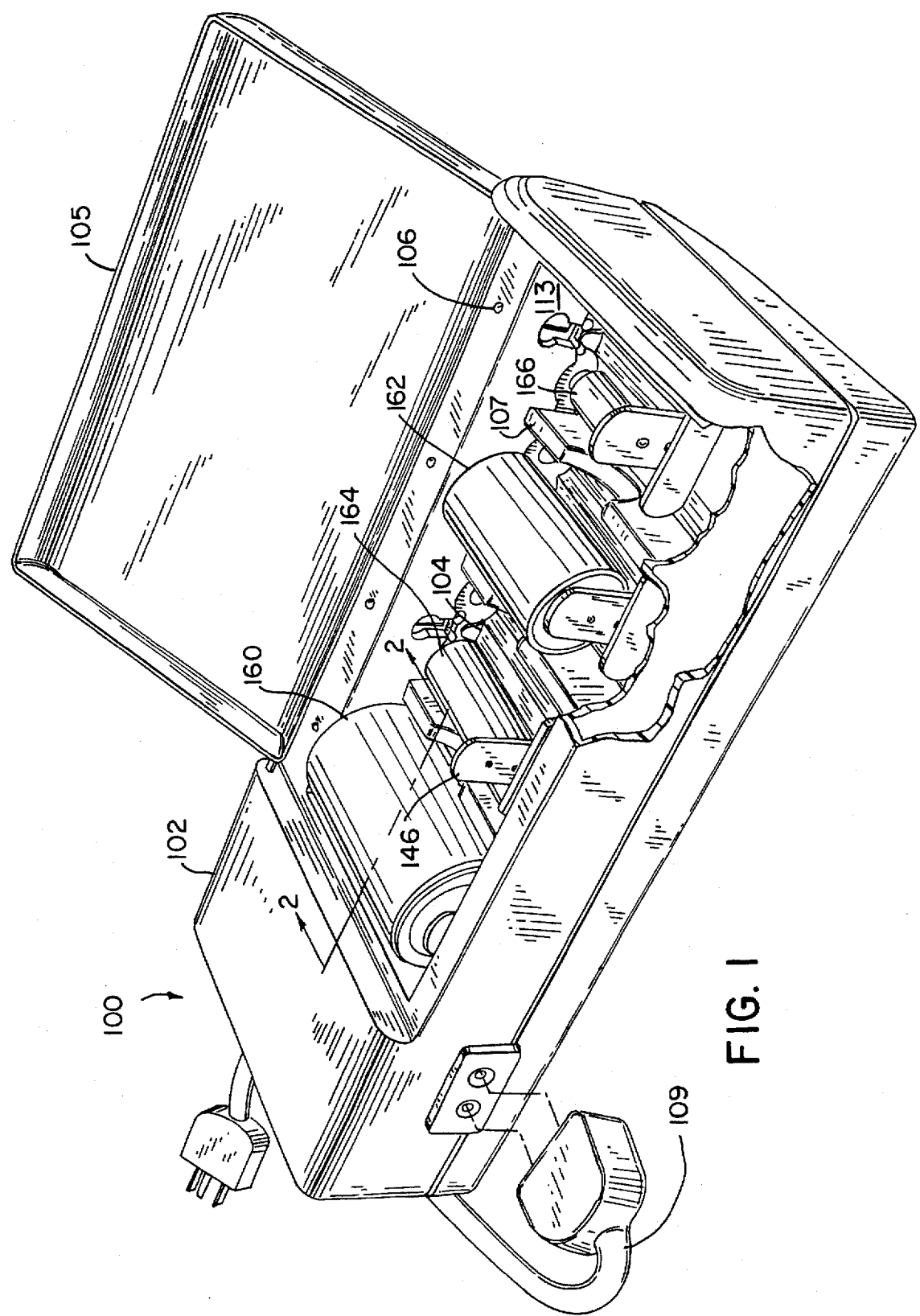
FIG. 1 is an isometric view of a battery charger of this invention charging a D-cell battery, a C-cell battery, a AA-cell battery, and a AAA-cell battery.

Referring more particularly to FIGS. 1–7, wherein like numbers refer to similar parts, a battery charger 100 for repeated charging of common battery sizes is shown in FIG. 1. The charger has a molded plastic housing 102 with portions which define four charging compartments 104. Each compartment 104 is configured to accept twice as many AAA- or AA-cell batteries as C- or D-cell batteries. The housing 102 is preferably fitted with a hinged lid 105 to prevent dust from accumulating in the compartments 104. Light emitting diodes 106 protrude from the housing 102 above each compartment, to indicate when the charger is supplying current to a particular battery or batteries. The charger 100 is provided with power by means of a removable power cord 109. Common household electrical current powers the battery charger 100.

Although the charger 100 may be configured to accept a greater or lesser number of batteries, a preferred embodiment of the invention is shown in FIG. 1. The compartments 104 defined in the housing have compound curved surfaces which accommodate different diameter battery cells, and which direct the cells into electrical engagement with the cathode contacts and anode contacts appropriate for that type of battery. The compartments are preferably separated by upwardly protruding dividers 107 which are recessed at the mid point to provide finger access openings for the batteries within the compartments.

Figure 2:
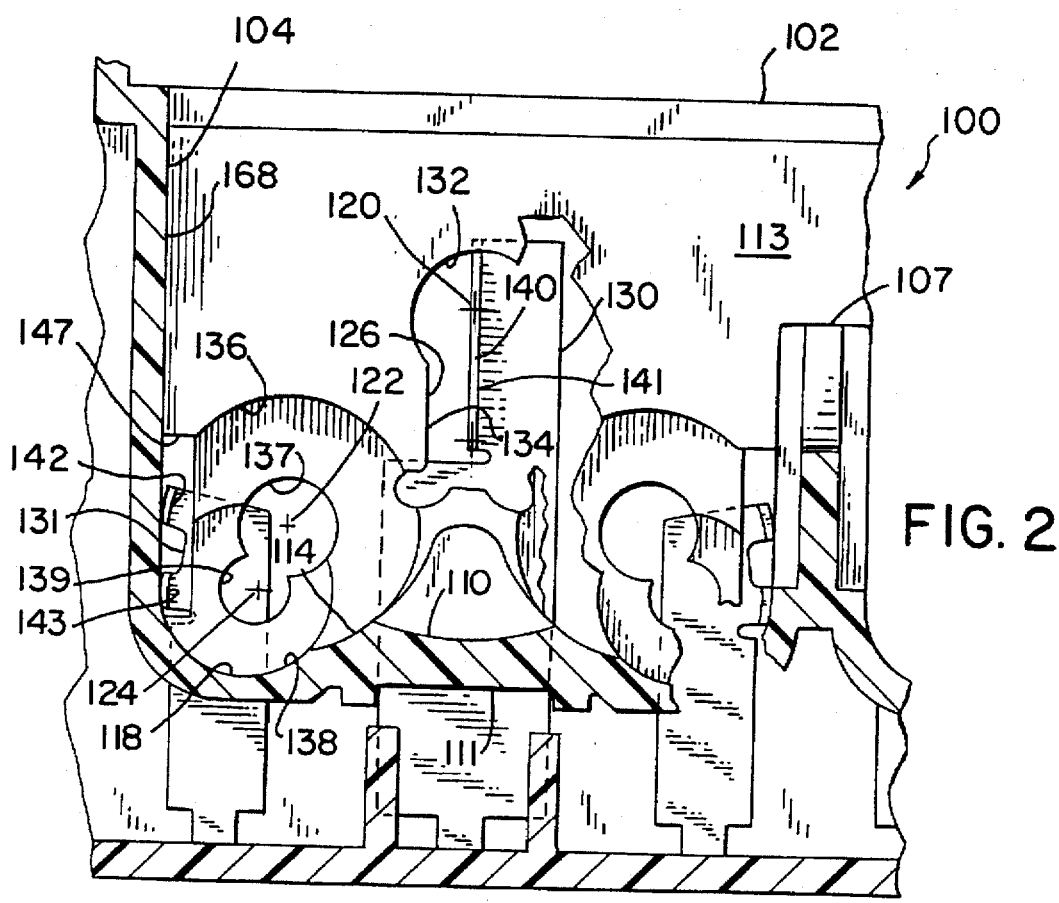
FIG. 2 is a fragmentary cross-sectional view of a battery compartment portion of the battery charger of FIG. 1 taken along section line 2—2.
Figure 6:
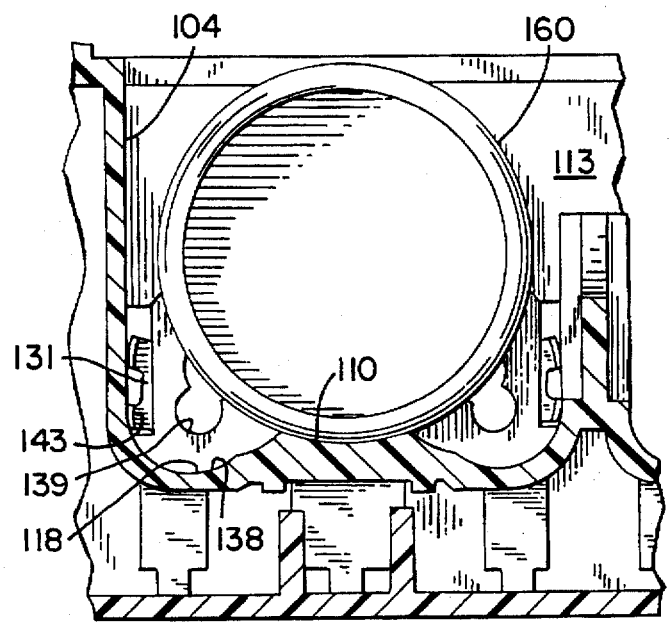
FIG. 6 is a schematic view of the charger compartment of FIG. 2 charging two D-cell batteries.

As shown in FIG. 2, each compartment 104 has a base 111 which is formed with parallel concave grooves or recesses which engage and support batteries of differing diameters. The largest diameter groove extends along the center of the compartment 104 and defines a first upwardly opening concave support surface 110. The radius of the first support surface 110 is approximately the radius of a D-cell battery. As shown in FIG. 6, a single D-cell battery 160 is received on the first support surface 110, and is thereby positioned centrally within the compartment 104. As shown in FIG. 2, a center cathode contact 130 is positioned centrally within the compartment 104, and an opening 126 is provided in the cathode end wall 113 of the compartment 104 so that the positive terminal nubbin of a D-cell battery 160 can engage the center cathode contact 130 when supported on the first support surface 110. The opening 126 defines portions of a circle 132 of approximately the diameter of the D-cell battery nubbin. The nubbin protrudes into the opening 126 to engage an upper segment 140 of the center cathode contact 130. The circular portions 132 of the opening 126 prevent sideward displacement of a D-cell battery 160 supported on the first support surface 110, and thus cooperates with the first support surface to retain the D-cell battery in position throughout an entire charging cycle. The negative terminal of the D-cell battery 160 engages a positionable anode contact 146, shown in FIG. 7. The structure of the compartment thereby holds the D-cell battery 160 for charging.

Figure 5:
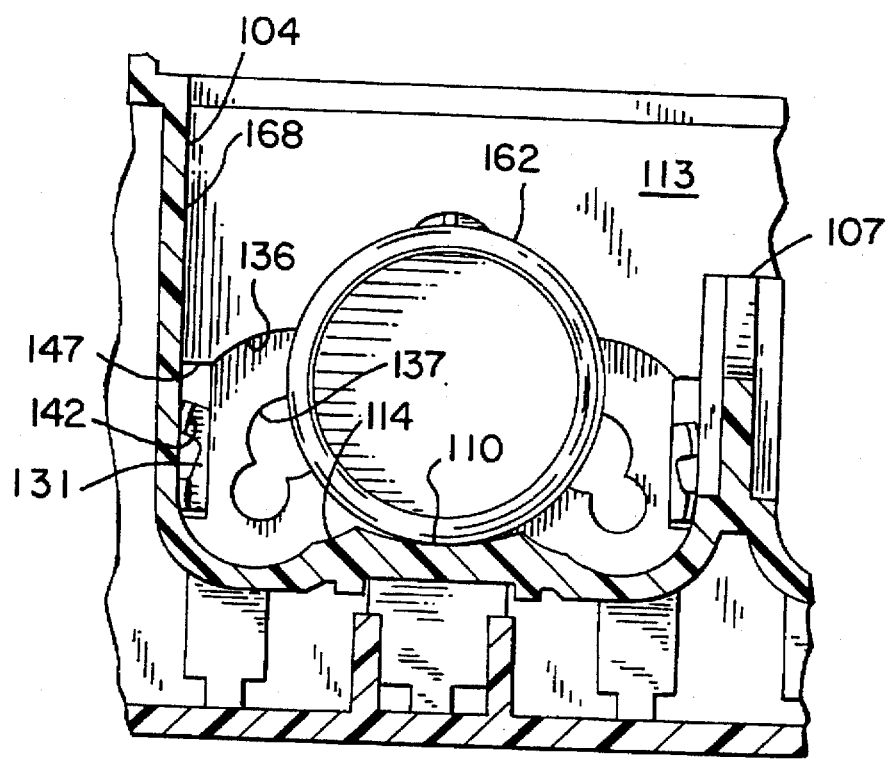
FIG. 5 is a schematic view of the charger compartment of FIG. 2 charging two C-cell batteries.

As shown in FIG. 5, the concave first support surface 110 alternatively supports a single C-cell battery 162. The C-cell battery, being smaller in diameter than the D-cell battery 160, makes only line contact with the first support surface 110. As shown in FIG. 2, the opening 126 in the cathode end wall 113 has portions 134 which are spaced horizontally approximately the width of a C-cell nubbin. The horizontally spaced portions 134 are positioned beneath the circular portions which receive a D-cell nubbin. The first support surface and the horizontally spaced portions 134 thus define the position of a C-cell battery 162 and hold it in place for engagement of the nubbin with a lower segment 141 of the center cathode contact 130. The negative terminal of the C-cell battery 162 also engages against the positionable anode contact 146, shown in FIG. 7. The diameter of the circular portions 132 and the horizontally spaced portions 134 shown in FIG. 2 may be selected to accommodate only a specially formed small nubbin on a specialized battery, to thereby prevent the insertion of a battery for recharging which is not suited to the particular electronics of the charger 100.

Figure 3:
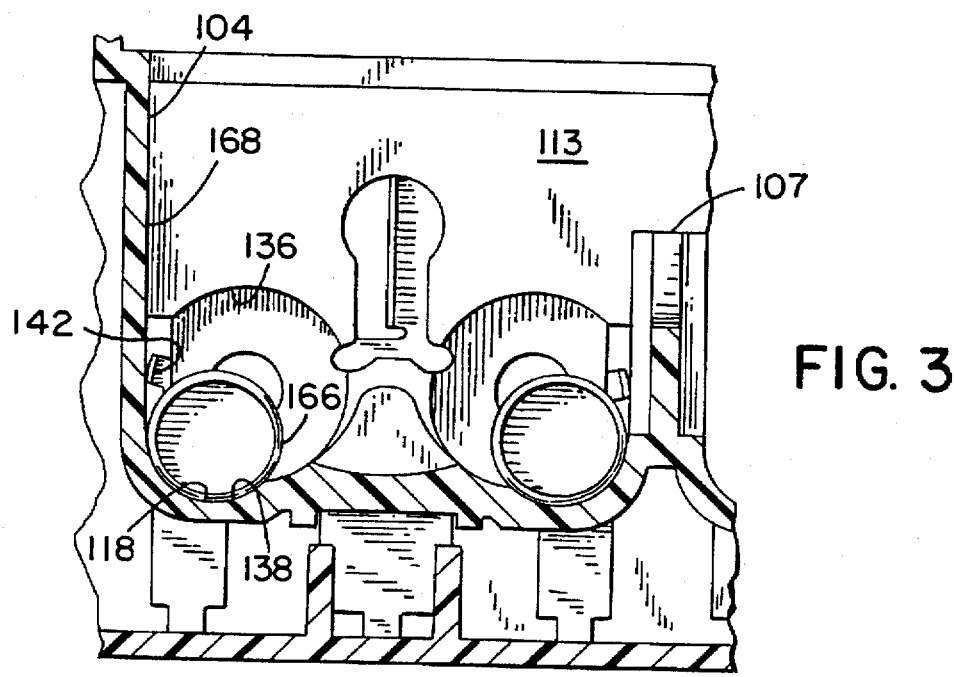
FIG. 3 is a schematic view of the charger compartment of FIG. 2 charging two AAA-cell batteries.
Figure 4:
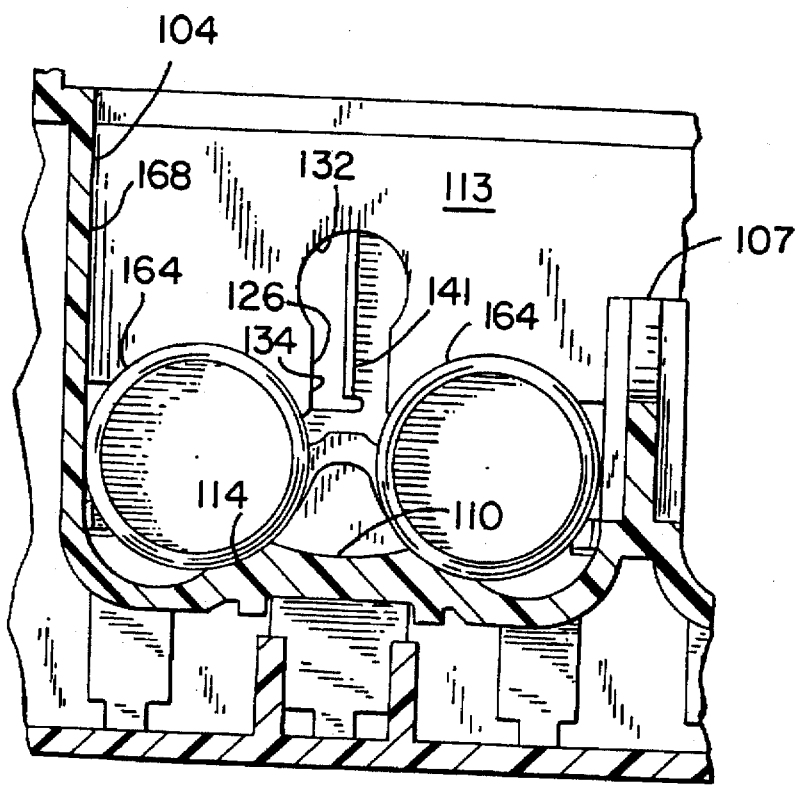
FIG. 4 is a schematic view of the charger compartment of FIG. 2 charging two AA-cell batteries.

The first support surface 110 thus accepts and positions either a D-cell or a C-cell battery. Thus the charger may readily accept four D-cells, four C-cells, or a combination of C-cells and D-cells totaling a maximum of four batteries. However, the compartments are further configured to accept two AA-cells 164, as shown in FIG. 4 or two AAA-cells 166, as shown in FIG. 3, within each compartment.

Each compartment can compactly receive two AA- or AAA-cells, as the diameter of the AA-cell is approximately half the diameter of the D-cell. The diameter of the AAA-cell is smaller still. As shown in FIG. 2, the base of each compartment 111 has grooved portions which define two upwardly opening concave second support surfaces 114, each with a radius for supporting and positioning a AA-cell battery. Each second support surface 114 extends sidewardly from the central first support surface 110, and faces away from the first support surface 110.

Whereas the first support surface engages entirely beneath a battery, as shown in FIG. 5, each second support surface 114 engages beneath and to one side of an AA-cell battery 164. As shown in FIG. 4, the other side of the AA-cell battery 164 engages against a vertical divider 107 or a side wall 168 of a terminal compartment. Thus supported on both sides, the AA-cell battery 164 is restrained from downward and sideward displacement, and is positioned for engagement with a side cathode contact 131, as shown in FIG. 2, which has an upper segment 142 which protrudes beyond the cathode end wall 113.

A circular depression 136 is formed in the cathode end wall 113 of approximately the diameter of the AA-cell battery to permit the battery to be positioned to make contact with the contact segment 142 which protrudes from a vertical slot 147 in the cathode end wall 113. Where batteries of a particular chemistry, for example Renewal® rechargeable alkaline manganese batteries manufactured by Rayovac Corporation of Madison, Wis., are employed, it is desirable to configure the charger compartment so that batteries for which the charger is not electrically configured will not be charged. As disclosed in U.S. Pat. No. 5,443,924, the disclosure of which is hereby incorporated by reference herein, batteries may be formed which lack insulation on the radial outward portions of the positive terminal. The illustrated embodiment of the charger 100 employs side contacts which engage the uninsulated top surface of a specially formed AA-cell battery. The nubbin of the AA-cell battery will project through a circular opening 137 in the center of the circular depression 136, and will not electrically engage the cathode contact 131. The charger of this invention may also be configured to accept batteries of other chemistries, for example, nickel-cadmium, lithium ion, and nickel metal hydride rechargeable batteries.

As shown in FIG. 2, a concave, upwardly facing third support surface 118 extends sidewardly and below each second support surface 114. The third support surface 118, as shown in FIG. 3, has a radius approximately equal to the radius of a AAA-cell battery 166. The third support surface 118 extends fully below the AAA-cell battery 166 and positions it so that the positive terminal will engage with the lower segment 143 of the side cathode contact element 131 shown in FIG. 2. As with the AA-cell battery, the AAA-cell battery 166 is received within a circular depression 138 formed in the cathode end wall 113, which is recessed more than the AA-cell circular depression 136, and a circular opening 139 centered in the circular depression receives the nubbin of the AAA-cell battery. No electrical contact is made at the nubbin, and hence a battery of an inappropriate type is not at risk of being improperly charged. Alternatively, the upper segment 142 and the lower segment 143 may be formed as a single bent flange of the contact element 131.

As shown in FIG. 2, each support surface has a respective center of radius 120, 122, and 124. The center of radius 120 of the first support surface 110 is located above the center of radius 122, 124 of the second and third support surfaces, 116 and 118. This allows two size AA cells or two size AAA cells to be placed within the same space occupied by one size D cell or one size C cell battery. In addition, the center of radius 122 of the second support surface 116 is located above the center of radius 124 of the third support surface 118, allowing a size AA cell or a size AAA cell battery to placed within a single space. Such a configuration minimizes the space required to charge different size batteries, and thereby decreases the size of the battery charger 100.

Figure 7:
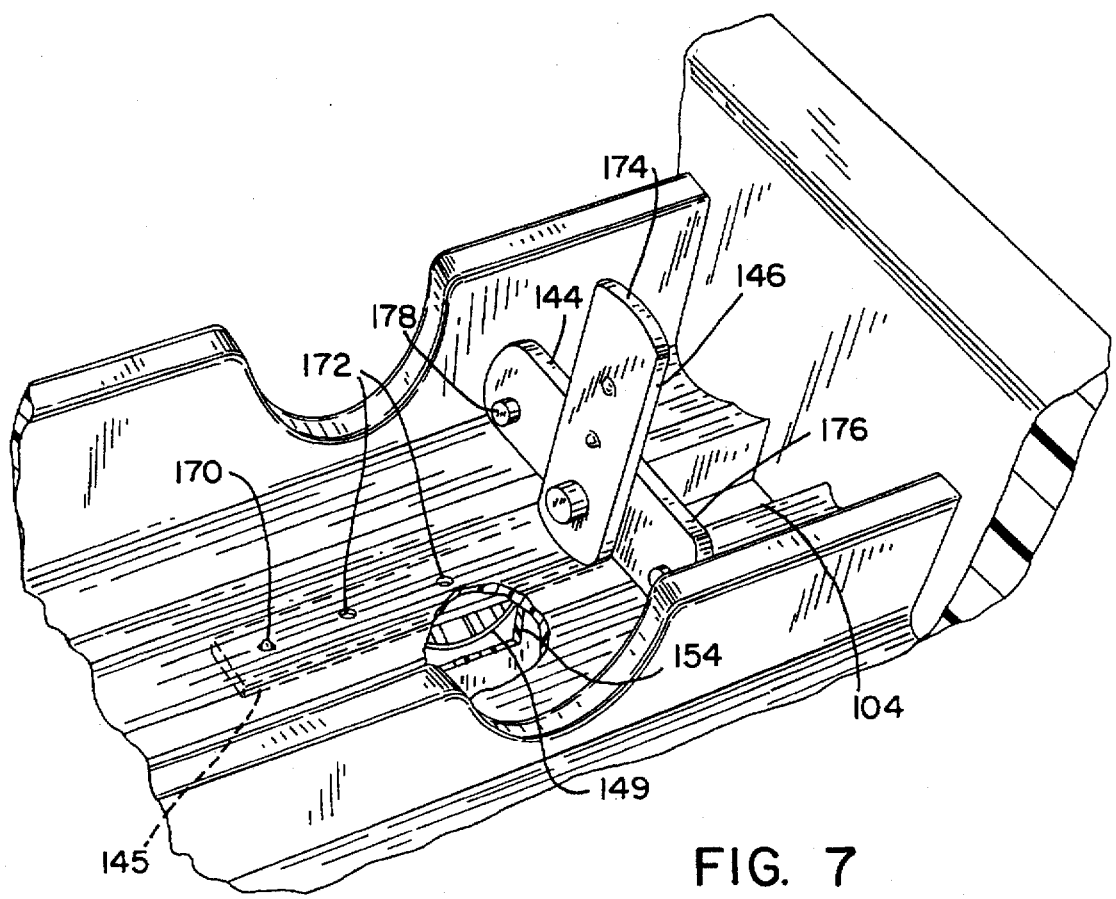
FIG. 7 is a fragmentary isometric view of a sliding contact of the battery charger of FIG. 1.

As shown in FIG. 7, in a preferred embodiment a contact element 144, preferably sliding, is located within each compartment 104. The contact element has a rigid slider 145 which is movable within a rectangular channel 154. A flexible metal spring 149 is connected to the slider which exerts upward pressure on the slider to bring it into engagement with the underside of the base 111 of the compartment 104. A stud 170 protrudes upwardly from the slider and is engageable with one of several holes 172 formed in the first support surface 110. The holes 172 are positioned to correspond to the desired anode contact position for the AAA-cell, the AA-cell, the C-cell, and the D-cell. When a battery of a particular length is to be charged, the upright arm 174 of the anode contact is gripped by the user and tilted forward, thereby disengaging the stud 170. The contact element 144 is then moved into the desired position and released. The spring 149 then engages within a hole 172 and positions the anode contact at the desired distance from the cathode contacts for optimal charging. The anode contact 146 may be provided with projecting knobs 178 on the upright arm to engage a C-cell battery 162 or a D-cell battery 160. A cross arm 176 is electrically connected to the upright arm 174, and may be provided with projecting knobs 178 for engaging the negative terminals of either AA- or AAA-cell batteries. It should be noted that the charger may alternatively be provided with conventional spring-type or biased contact elements for the anode contacts. In addition, although holes have been disclosed for receiving the battery nubbins, alternative conventional cathode contacts may be employed, such as spring-type or biased elements.

In the process of charging secondary batteries the amount or state of charge on the battery being charged should be monitored. The voltage produced by a secondary cell is directly related to the electrochemical condition of the cell. Knowing the state of charge of a cell is critical because the amount of current or electrical charge which a cell can accept is dependent on the state of charge of that cell. If the cell has been discharged beyond a given amount it is necessary with alkaline manganese batteries to charge at a low rate. If the cell is not completely discharged than a higher charge current can be used until the battery reaches a state of around 70 to 80 percent charge. Completion of the charge must then be at a reduced rate or current. Charging the cell too rapidly or over-charging the cell can damage the battery, reduce the battery's life or even create an unsafe condition.

Alkaline manganese batteries, in addition to having an electrochemical system which produces a voltage, have a relatively high internal resistance. This internal resistance causes a voltage drop which, in accord with Ohm's Law, is dependent on the current flowing through the cell. It is the voltage produced by the electrochemical process within the battery which is indicative of the state of charge of the cell. The only way to accurately determine cell voltage is to perform the measurement at zero current flow. And the measurement must be performed accurately because the voltage varies only a small percentage between completely discharged and completely charged. Thus alkaline manganese batteries are charged with pulse DC current chargers which have periods of zero current between charging pulses, see for example U.S. Pat. No. 5,422,559 which is incorporated herein by reference.

The charger 20 preferably provides rectified DC pulses at twice the line frequency. Line frequency is 60 Hz and 120 volts in the United States, in some countries the line frequency may be 50 Hz and the line voltage may be 120 or 220 volts. A preferred transformer will incorporate a winding to accommodate 220 voltage and the voltage supplied by the transformer will be sufficiently above the needed two ½ volts that the charging can function adequately on the 90 volts supplied in some rural Japanese regions. The battery charger circuit utilizes a transformer to step down and rectify the line voltage to the charging voltage which for an alkaline manganese cell is about 2.5 volts. The resulting pulsed DC current has periods of time between DC pulses where the current supplied to the cell is zero. During these periods of time the open circuit voltage (i.e. the voltage at zero current), which corresponds to the cell state of charge can be monitored. The charging circuit than decides whether or not to provide the next pulse of DC charging current to a particular cell.

The voltage monitoring circuit also detects whether a cell is present. In the battery charger 20 the presence of a detectable voltage at a given charging station informs the charger which stations are occupied. Knowing which stations are occupied in combination with the cell open circuit voltage allows the proper amount of current to be supplied to that cell depending on cell type and cell state of charge.

The total energy a battery may store is roughly proportional to the battery's volume. Thus smaller cells will charge more rapidly and this will be detected by the open circuit voltage (OCV) measuring circuit and over charging will thus be avoided. The charger 20 may employ a single 8 Amp transformer which supplies 4 Amps to two charger circuits. Each of the charger circuits is connected to four AA or AAA stations and two D or C stations. In this way eight AA batteries can be charged.

The charge indicator lights are controlled by the charger electronic circuitry.

The charging circuit controls the amount of current being sent to each battery by varying the number of pulses which are sent or not sent to a given battery. Approximately 70 percent of the power supplied by the transformer can be used to charge batteries within the battery charger. Different levels of current are selectively applied to different size batteries. For example, the current level supplied to each battery present in the charger may be the same 120 pulses per second. Each pulse has a peak current of about 800 milliAmps and an average current during the pulse of about 400 milliAmps which over the 70 percent of the cycle during which the pulse is present results in a overall average current available of 280 milliAmps. The internal impedance on the battery and its current state of charge controls how much current a given battery receives from a single pulse. The open circuit voltage which is measured each cycle controls how often a pulse is sent. The AAA cells rapidly reach a state of charge where the pulses are decreased in frequency, while the length of time for the D cells to reach this charge level is greater. The impedance of AAA cells is also higher, reducing the amount of current they receive.

The open circuit voltage is about 1.65 volts when the battery is sufficiently charged that the charge light goes out. However the charger continues to charge every battery contained within the charger at whatever rate the voltage detecting circuit indicates the cell can accept without an over-voltage condition occurring. This may be as little as a single pulse every few minutes.

It is to be understood that although the illustrated charger has support surfaces and contacts for the charging of D-cell, C-cell, AA-cell, and AAA-cell batteries, the charger may also be provided with appropriately shaped compartments and contact elements to receive and charge size AAAA cells. Furthermore, although contact arrangements for recharging Rayovac Corporation RENEWAL brand rechargeable alkaline manganese batteries have been illustrated and described, alternative contact arrangements and charging circuitry for charging conventional nickel cadmium or other rechargeable chemistries may also be employed. In addition, instead of employing mechanical discrimination strategies for preventing the charging of unsuitable battery types, electronic discrimination circuits of a conventional nature may be employed.

Furthermore, although separate charging circuits for the AA and AAA battery contacts have been disclosed, the circuits for the AA and AAA battery contacts may be connected in parallel. In addition a single charger may be provided with mechanical or electronic discrimination and appropriate charging electronics to allow the acceptance of two or more battery types, for example RENEWAL brand batteries as well as Nickel Cadmium, Nickel Metal Hydride, or Lithium Ion batteries. Alternatively, common charging circuitry could be provided.

Although separate positions for AA and AAA batteries are disclosed, a single position which accommodates both AA and AAA size batteries may be employed, with discrimination by height or no discrimination. Furthermore, although radiused concave support surfaces for the batteries have been shown, step-type support surfaces with generally vertical side walls to retain the batteries may be employed.

It is understood that the invention is not limited to the particular construction and arrangement of parts herein illustrated and described, but embraces such modified forms thereof as come within the scope of the following claims.

We claim:

1. A battery charger for charging rechargeable batteries, the charger comprising:

a) a housing having portions defining at least one compartment wherein the compartment has a first support element having portions defining an upwardly opening concave first support surface having a first radius, the first support surface engaging and supporting a battery of the type selected from the group consisting of size C cells and size D cells, and wherein the compartment has two second support elements, one on each side of the first support element, each second support element having portions defining an upwardly opening concave second support surface having a second radius, the second support surface engaging and supporting a battery of the type selected from the group consisting of size AA cells, and size AAA cells; and b) contact elements positioned in the housing to engage the anode and cathode ends of batteries supported therein for electrically contacting and facilitating the charging of the batteries.

2. The battery charger of claim 1 wherein portions of the housing have a plurality of recessed segments which define a cavity having dimensions corresponding to the diameter and height of a cathode located on a battery of the type selected from the group consisting of size C cells, size D cells, size AA cells, size AAA cells, and size AAAA cells.

3. The battery charger of claim 2 wherein the recessed segments define one or more circular cavities having contact elements positioned therein, and wherein each circular cavity fixedly engages and positions therein a nubbin located at the cathode end of the battery, allowing the nubbin to engage the contact element, forming a closed circuit.

4. The battery charger of claim 1 wherein the second support element has portions defining an upwardly opening concave first supplemental support surface having a radius for engaging and supporting a size AA cell, and an upwardly opening concave second supplemental support surface having a radius for engaging and supporting a size AAA cell.

5. The battery charger of claim 4 wherein a center of radius of the first supplemental support surface is located above the center of radius of the second supplemental support surface.

6. The battery charger of claim 1 wherein the compartment holds four size D cells, four size C cells, eight size AA cells, or eight size AAA cells.

7. The battery charger of claim 1 wherein a center of radius of the first concave support surface is located above a center of radius of the second concave support surface.

8. The battery charger of claim 1 wherein the contact element relative to the anode end of the battery is slidably adjustable to fixedly engage and position the anode end of the battery, forming a closed circuit.

9. The battery charger of claim 1 further comprising two side contact elements positioned to engage batteries supported on the second support surfaces, wherein the side contact elements are spaced sidewardly from a center contact element.

10. A battery charger for charging standard consumer batteries comprising:

a) a housing having exactly four means for receiving and charging a D cell battery;

b) each of the means for charging also having secondary means for receiving and charging exactly one C cell when a D cell is not received by the receiving means; and c) each of the means for charging also having tertiary means for receiving and charging exactly two cells selected from a group including only AA and AAA cells when cells not selected from the group are not received by the means for receiving.

11. A battery charger for charging standard consumer batteries comprising a housing having exactly twelve charging stations, the charging stations grouped together in groups of three, each group of charging stations accommodating exactly two cells selected from a first group including only AA and AAA cells and each group of three accommodating exactly one cell selected from a second group including only C and D cells, no group of three charging stations accommodating cells selected from the first group and the second group simultaneously.

12. A battery charger for charging rechargeable batteries, the charger comprising:

a) a housing having portions defining at least one compartment wherein the compartment has a first support element having portions defining an upwardly opening first support surface, the first support surface engaging and supporting a battery of the type selected from the group consisting of size C cells and size D cells, and wherein the compartment has two second support elements, one on each side of the first support element, each second support element having portions defining an upwardly opening second support surface, the second support surface engaging and supporting a battery of the type selected from the group consisting of size AA cells, and size AAA cells; and b) contact elements positioned in the housing to engage the anode and cathode ends of batteries supported therein for electrically contacting and facilitating the charging of the batteries.

\* \* \* \* \*